United States Patent
Alakuijala et al.

(10) Patent No.: US 12,309,367 B2
(45) Date of Patent: May 20, 2025

(54) BICRITERIA BLOCK SPLITTING HEURISTIC FOR LOSSY COMPRESSION

(71) Applicant: Google LLC, Mountain View, CA (US)

(72) Inventors: Jyrki Alakuijala, Wollerau (CH); Luca Versari, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 106 days.

(21) Appl. No.: 17/917,540

(22) PCT Filed: Apr. 8, 2020

(86) PCT No.: PCT/US2020/027139
§ 371 (c)(1),
(2) Date: Oct. 6, 2022

(87) PCT Pub. No.: WO2021/206699
PCT Pub. Date: Oct. 14, 2021

(65) Prior Publication Data
US 2023/0141888 A1 May 11, 2023

(51) Int. Cl.
*H04N 11/02* (2006.01)
*H04N 19/119* (2014.01)
*H04N 19/154* (2014.01)
*H04N 19/176* (2014.01)
*H04N 19/86* (2014.01)

(52) U.S. Cl.
CPC ......... *H04N 19/119* (2014.11); *H04N 19/154* (2014.11); *H04N 19/176* (2014.11); *H04N 19/86* (2014.11)

(58) Field of Classification Search
CPC .................................................... H04N 19/119
See application file for complete search history.

(56) References Cited

U.S. PATENT DOCUMENTS

| | | | | |
|---|---|---|---|---|
| 5,852,470 A * | 12/1998 | Kondo | ................. | H04N 7/0125 348/448 |
| 5,999,218 A * | 12/1999 | Yokoyama | ............. | H04N 19/60 341/200 |
| 10,178,406 B2 * | 1/2019 | Liang | ................... | H04N 19/172 |

(Continued)

OTHER PUBLICATIONS

International Search Report and Written Opinion of International Application No. PCT/US2020/027139 dated Aug. 21, 2020, 15 pgs.

(Continued)

*Primary Examiner* — Leron Beck
(74) *Attorney, Agent, or Firm* — Young Basile Hanlon & MacFarlane, P.C.

(57) ABSTRACT

A method for partitioning a block of an image to reduce quantization artifacts includes estimating an expected entropy of the block; partitioning the block into sub-blocks, where each sub-block having a size of a smallest possible partition size; calculating respective amounts of visual masking for the sub-blocks; selecting, as a visual masking characteristic of the block, a highest visual masking value of the respective amounts of visual masking for the sub-blocks; combining the visual masking characteristic of the block and the expected entropy of the block to obtain a splitting indicator value; and determining whether to split the block based on the splitting indicator.

20 Claims, 10 Drawing Sheets

(56) References Cited

U.S. PATENT DOCUMENTS

| | | | | |
|---|---|---|---|---|
| 2003/0035477 | A1* | 2/2003 | Sekiguchi | H04N 19/19 375/240.06 |
| 2003/0086623 | A1* | 5/2003 | Berkner | H04N 19/48 375/E7.206 |
| 2004/0184546 | A1* | 9/2004 | Haskell | H04N 19/19 375/E7.176 |
| 2006/0171457 | A1* | 8/2006 | DeGarrido | H04N 19/16 348/700 |
| 2006/0245492 | A1* | 11/2006 | Pun | H04N 19/142 375/E7.181 |
| 2008/0225947 | A1* | 9/2008 | Narroschke | H04N 19/19 375/E7.076 |
| 2010/0086030 | A1* | 4/2010 | Chen | H04N 19/147 375/E7.243 |
| 2011/0310976 | A1* | 12/2011 | Wang | H04N 19/61 375/E7.176 |
| 2012/0106649 | A1* | 5/2012 | Wang | H04N 19/186 375/240.18 |
| 2013/0089145 | A1* | 4/2013 | Guo | H04N 19/122 375/E7.243 |
| 2017/0085886 | A1* | 3/2017 | Jacobson | H04N 19/154 |
| 2018/0376153 | A1* | 12/2018 | Gokhale | H04N 19/147 |

OTHER PUBLICATIONS

Yongfei Zhang et al., "Fast residual quad-tree coding for the emerging high efficiency video coding standard", China Communications, China Institute of Communications, Piscataway, NJ, USA, vol. 10, No. 10, Oct. 1, 2013, pp. 155-166.

Huang Bo et al., "Rate-Distortion-Complexity Optimized Coding Mode Decision for HEVC", IEEE Transactions on Circuits and Systems for Video Technology, Institute of Electrical and Electronics Engineers, US, vol. 38, No. 3, Jan. 21, 2019, pp. 795-889.

Lu Yu et al., "Hierarchical Classification for Complexity Reduction in HEVC Inter Coding", IEEE Access, IEEE, USA, vol. 8, Mar. 6, 2020, pp. 41698-41784.

Liquan Shen et al., "Fast TU size decision algorithm for HEVC encoders using Bayesian theorem detection", Signal Processing, Image Communication., vol. 32, Feb. 4, 2015, pp. 121-128.

Butteraugli Estimates the Psychovisual Difference Between Two Images, Mar. 2019, downloaded from <https://opensource.google/projects/butteraugli> on Oct. 6, 2022, 3pgs.

* cited by examiner

FIG. 9

BICRITERIA BLOCK SPLITTING HEURISTIC FOR LOSSY COMPRESSION

BACKGROUND

Image content (e.g., content of still images or frames of video) represents a significant amount of online content. For example, a web page may include multiple images, and a large portion of the time and resources spent rendering the web page is dedicated to rendering those images for display. The amount of time and resources required to receive and render an image for display depends in part on the manner in which the image is compressed. As such, an image can be rendered faster by reducing the total data size of the image using lossy compression and decompression techniques.

Lossy compression techniques seek to represent image content using fewer bits than the number of bits in the original image. Lossy compression techniques can introduce visual artifacts, such as ringing artifacts and banding artifacts, into the decompressed image. Higher compression levels can result in more observable artifacts. It is desirable to minimize the number of artifacts while maintaining high levels of compression.

SUMMARY

One aspect of this disclosure is a method for partitioning a block of an image to reduce quantization artifacts. The method includes estimating an expected entropy of the block; partitioning the block into sub-blocks, where each sub-block has a size of a smallest possible partition size; calculating respective amounts of visual masking for the sub-blocks; selecting, as a visual masking characteristic of the block, a highest visual masking value of the respective amounts of visual masking for the sub-blocks; combining the visual masking characteristic of the block and the expected entropy of the block to obtain a splitting indicator value; and determining whether to split the block based on the splitting indicator.

Another aspect is an apparatus for partitioning a block of an image to reduce quantization artifacts. The apparatus includes a memory and a processor. The processor is configured to execute instructions stored in the memory to estimate an expected entropy of the block; partition the block into sub-blocks, where each sub-block has a size of a smallest possible partition size; calculate respective amounts of visual masking for the sub-blocks; select, as a visual masking characteristic of the block, a highest visual masking value of the respective amounts of visual masking for the sub-blocks; combine the visual masking characteristic of the block and the expected entropy of the block to obtain a splitting indicator value; and determine whether to split the block based on the splitting indicator.

Another aspect is a non-transitory computer-readable storage medium that includes executable instructions that, when executed by a processor, facilitate the performance of operations, including estimating an expected entropy of the block; partitioning the block into sub-blocks, where each sub-block has a size of a smallest possible partition size; calculating respective amounts of visual masking for the sub-blocks; selecting, as a visual masking characteristic of the block, a highest visual masking value of the respective amounts of visual masking for the sub-blocks; combining the visual masking characteristic of the block and the expected entropy of the block to obtain a splitting indicator value; and determining whether to split the block based on the splitting indicator.

These and other aspects of the present disclosure are disclosed in the following detailed description of the embodiments, the appended claims, and the accompanying figures.

It will be appreciated that aspects can be implemented in any convenient form. For example, aspects may be implemented by appropriate computer programs, which may be carried on appropriate carrier media. The appropriate carrier media may be tangible carrier media (e.g., disks) or intangible carrier media (e.g., communications signals). Aspects may also be implemented using suitable apparatuses, which may take the form of programmable computers running computer programs arranged to implement the methods and/or techniques disclosed herein. Aspects can be combined such that features described in the context of one aspect may be implemented in another aspect.

BRIEF DESCRIPTION OF THE DRAWINGS

FIG. 9 is an example of calculating Laplacians according to implementations of this disclosure.

DETAILED DESCRIPTION

Figure 1:
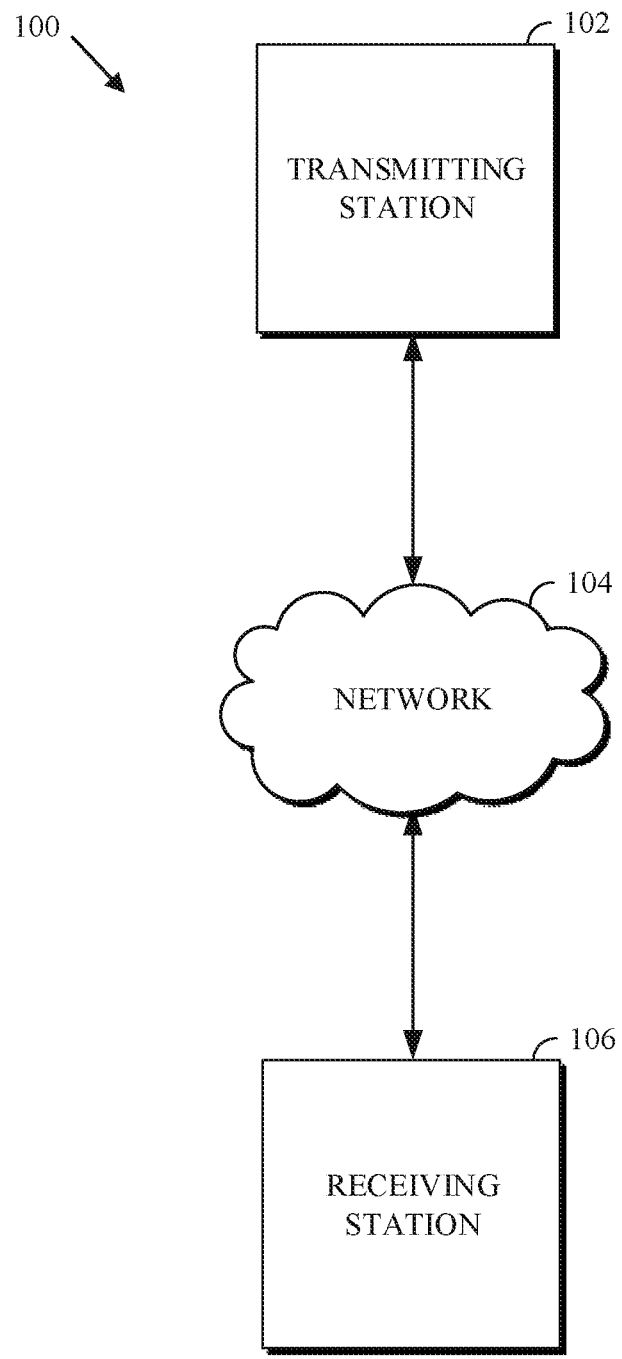
FIG. 1 is a diagram of a computing device in accordance with implementations of this disclosure.

Video compression schemes may include breaking each image (a single image or a frame of a video) into smaller portions, such as blocks, and generating an output bitstream using techniques to limit the information included for each block in the output. An encoded bitstream can be decoded to re-create the blocks and the source images from the limited information. In some implementations, the information included for each block in the output may be limited by reducing spatial redundancy, reducing temporal redundancy (in the case of video), or a combination thereof. For example, temporal (in the case of video frames) or spatial redundancies may be reduced by predicting a frame based on information available to both the encoder and decoder, and including information representing a difference, or residual, between the predicted frame and the original frame.

The residual information may be further compressed by transforming the residual information into transform coefficients. Transforming the residual information into transform coefficients can include a quantization step, which introduces loss—hence the name or term "lossy compression."

Lossy compression can be used to code visual information of an image. A lossy compression technique can be applied to a source image to produce a compressed image. The inverse of the lossy technique can be applied to the compressed image to produce a decompressed image. The lossy aspect of a lossy compression technique can be attributed, at least partially, to the quantizing of frequency domain information (as further described below). The amount of loss is dictated by a quantization step, which uses a quantization parameter (QP).

A quantization parameter can be used to control the tradeoff between rate and distortion. Usually, a larger quantization parameter means higher quantization (such as of transform coefficients) resulting in a lower rate but higher distortion; and a smaller quantization parameter means lower quantization resulting in a higher rate but a lower distortion. The variables QP, q, and Q may be used interchangeably in this disclosure to refer to a quantization parameter.

Typically, an image block (e.g., a luminance block or a chrominance block) may be partitioned into smaller blocks. One partitioning (i.e., prediction partitioning) of the block can be for the purpose of prediction. Another partitioning (i.e., transform partitioning) can be for the purpose of transforming the residual of the prediction into the transform domain. The residuals of the prediction are transformed into the transform domain using a transform type, such as the Discrete Cosine Transform (DCT). The prediction partitioning and the transform partitioning do not necessarily result in the same partitioning of the source block. To illustrate, the image block may be a 32×32 luminance block. The prediction partitioning may be, in raster scan order, the sub-blocks of sizes 8×16, 8×16, 16×16, 16×16, 16×8, and 16×8. On the other hand, the transform partitioning may be, in raster scan order, 8×8, 8×8, 8×8, 8×8, 16×16, 16×16, 8×8, 8×8, 8×8, and 8×8. The sub-blocks of the prediction partitioning and/or the transform partitioning can be square or rectangular.

Traditionally, determining a transform partitioning for transforming the residual information can include recursively determining whether a cost for using a current block size transform exceeds a cost for partitioning the current block into sub-blocks and encoding using sub-block size transforms. If the cost for encoding using sub-block size transforms is smaller, repeating the determination for each sub-block using the sub-block size as the current block size and using a smaller sub-block size as the sub-block size.

The cost is typically based on a rate-distortion (RD) function defined to balance rate versus distortion, given a certain desired quality. Rate refers to the number of bits required for encoding (such as encoding a block, a frame, quantized transform block coefficients, etc.). Distortion measures the quality loss between a source image block and a reconstructed version of the source image block. By performing a rate-distortion optimization (RDO) process, a codec optimizes the amount of distortion against the rate required to encode the video (i.e., a specified quality).

RD costs are typically computed using the quantization parameter. More generally, whenever an encoder decision (e.g., a mode decision) is based on the RD cost, the QP value may be used by the encoder to determine the RD cost.

The QP can be used to derive a multiplier that is used to combine the rate and distortion values into one metric. Some codecs may refer to the multiplier as the Lagrange multiplier (denoted $\lambda_{mode}$); other codecs may use a similar multiplier that is referred to as rdmult. Each codec may have a different method of calculating the multiplier. Unless it is stated otherwise, the multiplier is referred to herein, regardless of the codec, as the Lagrange multiplier or Lagrange parameter.

For example, given a mode m that corresponds to a certain transform partitioning, let $r_m$ denote the rate or cost (in bits) resulting from using a mode m, and let $d_m$ denote the resulting distortion. The rate-distortion cost of selecting the mode m can be computed as a scalar value: $d_m+\lambda_{mode}r_m$. By using the Lagrange parameter $\lambda_{mode}$, it is then possible to compare the cost of two modes and select one with the lower combined RD cost. This technique of evaluating rate-distortion cost is a basis of mode decision processes in at least some codecs.

As mentioned above, lossy compression aims to describe (i.e., code, compress, etc.) an image with the least number of bits while preserving, as much as possible, the quality of the image when the compressed image is decompressed. That is, lossy compression techniques seek to compress an image without degrading the quality of the image beyond an unacceptable level.

Figure 10:
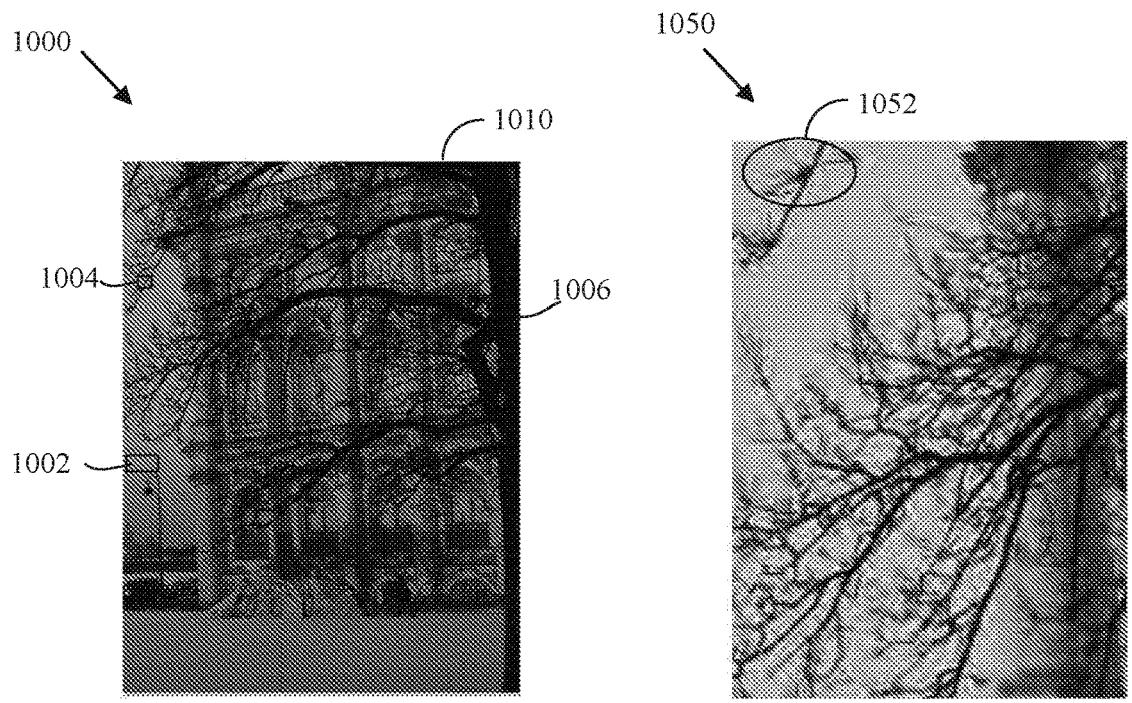
FIG. 10 is an example of a ringing artifact according to implementations of this disclosure.

During compression, fewer bits can be used to describe slow-changing areas and/or objects of the image than can be used to describe fast-changing areas and/or objects. "Slow-changing" and "fast-changing" in this context refer to changes in the frequency domain. FIG. 10 is an example 1000 of a ringing artifact according to implementations of this disclosure. In the example 1000, an image, such as an image 1010, includes a sky that forms the background of the image 1010 and branches that occlude at least part of the background. The areas covered by the sky background, such as an area 1002, are slow-changing areas. That is, the slow-changing areas correspond to spatially low-frequency areas. The areas of the image 1010 that include the transitions between the background sky and the branches, such as an area 1004, are fast-changing areas. A zoom 1050 illustrates a zoomed-in area of the image 1010 that includes the area 1004. The fast-changing areas correspond to spatially high-frequency areas. An area 1006 (i.e., a portion of the tree trunk) illustrates another example of slow-changing areas. As such, the image 1010 illustrates that the background sky includes mostly slow-changing areas but also includes fast-changing areas.

As further described below, encoding an image or an image of a video (i.e., a frame of a video) can include partitioning the image into blocks. As used herein, both "image" and "picture" refer to a single image or to a frame of a video. A block can include slow-changing areas (i.e., low-frequency signals) and fast-changing areas (i.e., high-frequency signals).

Lossy compression techniques can produce undesirable artifacts, such as ringing artifacts, which appear at sharp transitions in an image (e.g., at the edges between the sky and the branches in the area 1004 of FIG. 10), banding artifacts, whereby smooth image gradients are transformed into perceivable, discrete bands, contouring, posterizing, or some other artifacts.

Ringing artifacts, for example, can result from compressing high-frequency signals. Ringing artifacts may appear as bands and/or ghosts near edges of objects in a decompressed image. The area 1052 of FIG. 10 illustrates an example of ringing. The ringing artifacts are due to undershoots and overshoots around the edges. "Undershoot" means that a value of a pixel in the decompressed image is less than the value of the same pixel in the source image. That is, "undershoot" can mean that pixels around the edges are de-emphasized. "Overshoot" means that a value of a pixel in the decompressed image is greater than the value of the same pixel in the source image. That is, "overshoot" can mean that some pixels around the edges are accentuated. That is, as a result of the lossy compression, some parts of a bright (dark) background can become even brighter (darker) in the decompressed image.

Overshoots and undershoots can result from frequency-domain sinc-type oscillations. For example, in an image that includes a bright (dark) background that is partially occluded by a dark (bright) foreground object, a step-like function exists at the edge of the background and the foreground object.

If the edge is compressed based on a frequency-based transform, increased levels of quantization result in the sinc-type oscillations at the proximity of the edge due to the frequency-limiting properties of quantization. As mentioned, undershoots and overshoots can be observed around the edge. Examples of the frequency-based transform (also referred to as "block-based transforms") include, as further described below, a Discrete Cosine Transform (DCT), a Fourier transform (FT), a Discrete Sine Transform (DST), or the like.

It is noted that larger transform blocks can allow for larger areas of the source image to share common parameters and can be efficient for homogeneous textures and at low bit rates. However, larger transform blocks come at the cost of artifacts propagating further in the image. That is, the artifacts can statistically propagate all the way through the blocks in the image that are covered by the transform block.

To illustrate, assume that an image includes a first 8×8 block that includes a lot of texture (e.g., a patch of grass) and a second, adjoining 8×8 image block that is smooth (e.g., a part of the hood of a car). If the first block and the second block were encoded (e.g., transformed) separately, then the reconstructed (e.g., decoded) version of the first block is likely to include ringing, whereas the reconstructed version of the second block would not. On the other hand, if the two blocks were transformed together using an 8×16 (or 16×8, depending on how the first block and the second block are arranged) transform size, then the reconstructed second block will also likely include ringing artifacts.

As described above, traditionally, the RD cost can be used to determine the transform partitioning given a target quality (e.g., a given QP value). The RD cost is calculated based on two objective measures (e.g., the cost in bits and the distortion).

However, using only the rate and the distortion can result in partitioning a block when that partitioning is not necessary, or in no partitioning when partitioning may be preferable.

This disclosure relates to transform partitioning. More specifically, the disclosure relates to determining an optimal partitioning of a block into sub-blocks so that each of the sub-blocks is then transformed using a transform type, such as the DCT. An optimal partitioning, as used herein, is one that results in a balance between reducing the number of bits for compressing the block while, at the same time, improving quality by limiting the propagation of quantization artifacts (e.g., ringing). A block partitioning (e.g., a transform block size) can be chosen according to an amount of ringing that is appropriate for the block based on the sub-blocks of the block.

With respect to limiting the propagation of artifacts, implementations of this disclosure determine whether artifacts from one block are likely to be visible or masked in neighboring blocks. If artifacts in a first block are likely to be masked in a second block, then the first and the second block can be combined into one block for the purpose of transformation into the frequency domain. If the artifacts of the first block are not likely to be masked in the second block, then the first block is not combined with the second block. Rather, the first block is transformed separately.

To determine whether a block should be partitioned, implementations of a bicriteria block splitting heuristic for lossy compression calculate a heuristic that combines two criteria to obtain a splitting indicator value. Whether a block should be split further depends on whether the splitting indicator value is above or below a threshold. Any number of values are possible for comparison to the splitting indicator value. In an example, the splitting indicator value can be compared to a constant that is empirically derived. In an example, the splitting indicator value can be compared to a value that is related (e.g., linearly related) to a target image quality and/or an allowed error. In an example, the splitting indicator value can be compared to a value that is derived based on a resulting partition size if the block were to be partitioned.

A first criterion estimates (e.g., approximates, correlates, etc.) an expected entropy that is needed to have a specified quality. The specific quality can be given by a particular QP value. A second criterion estimates how easily visible would an artifact (e.g., a ringing artifact) be in that block. The second criterion is an estimate of the impact of the artifacts in a sub-block on neighboring sub-blocks. That is, the second criterion estimates the amount of visual masking in sub-blocks of the block. The sub-blocks can each have a size of a smallest possible partition size that is typically supported by the codec determining the splitting. In an example, the block can be a luminance block of size 32×32 and the smallest possible partition size can be 8×8. However, other block sizes and smallest possible partition sizes may be used. In an example, the smallest size of each of the sub-blocks can change based on a target quality. For example, at a highest quality (e.g., a butteraugli limit<1.0, or some other quality criterion), the visual masking sub-block size can be set to 5×5 or some other such small size; and the smallest size can be expanded to a larger size (e.g., 12×12, 16×16, etc.) at low qualities (e.g., butteraugli limit>4 or 8, or some other quality criterion). The butteraugli limit is explained below.

Visual masking is a property of the human eye. Visual masking allows some of the artifacts to disappear (e.g., to become unnoticeable) and some of the artifacts to appear (e.g., to be noticeable). As such, if artifacts (e.g., ringing artifacts) in a sub-block are likely to disappear in other sub-blocks of the block (i.e., more accurately, the reconstructed version of the sub-blocks), then that weighs in favor of combining the sub-block with the other neighboring sub-blocks for the purpose of transformation using a transform, such as the DCT, of a size of the combined sub-blocks. On the other hand, if the artifacts are not likely to disappear in the neighboring sub-blocks, then that weighs in favor of transforming the sub-block without combining the sub-block with the other neighboring sub-blocks.

As such, for example, when determining whether to partition an N×N block (e.g., a 32×32 block), implementations according to this disclosure, in addition to considering the entropy needed to achieve a specified quality in the block (e.g., an indication of rate), consider the masking properties within that block.

To illustrate, given a N×N (e.g., 32×32) block, the smallest possible sub-blocks (e.g., 8×8) of the block can be considered. The visual masking properties (or simply, masking properties) of each of the sub-blocks can be considered (e.g., calculated, determined, etc.). If any of the sub-blocks are flat (e.g., include little to no texture), then that sub-block is likely to show artifacts propagated from another sub-block more easily than if the sub-block were noisy (e.g., including a lot of texture). If every sub-block of the N×N block had some noise (such as in a case that the N×N block is a block of an image of a carpet, a bush, or grass), then any artifacts in one sub-block could be hidden (e.g., masked by visual masking) in the texture of the other sub-blocks. On the other hand, if at least a portion of the remaining part of the N×N block is smooth (such as in the case of the sky or the paint of a car), then there is no visual masking and the visibility of artifacts comes through (e.g., is propagated to the at least the portion of the remaining part of the N×N block).

Thus, the bicriteria block splitting (i.e., transform partitioning) heuristic refers to using both a cost in bits (a first criterion) and the visual masking within a sub-block (a second criterion) to determine the block partitioning. The worst-case area (i.e., one or more sub-blocks of the block) of visual masking within the block is determined. The artifacts are assumed to propagate throughout the block in an equal manner. Thus, the artifacts within the block can be assumed to be determined by the area of lowest visual masking within the block.

Benefits of the bicriteria block splitting heuristic for lossy compression include that a single heuristic (the bi-criteria block splitting heuristic) can be used for a large range of images (such as graphics, photographs, screen captures, and user interface elements) while preserving the natural look of fragile textures (such as forest, marble, skin) and while, at the same time, still using smaller integral transforms where the smaller transforms can be useful (such as in the case of screenshots, graphics, or boundaries between smooth and non-smooth areas).

Details of the bicriteria block splitting heuristic for lossy compression are described herein with initial reference to a system in which the teachings herein can be implemented. FIG. 1 is a schematic of a video encoding and decoding system 100. A transmitting station 102 can be, for example, a computer having an internal configuration of hardware, such as that described with respect to FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
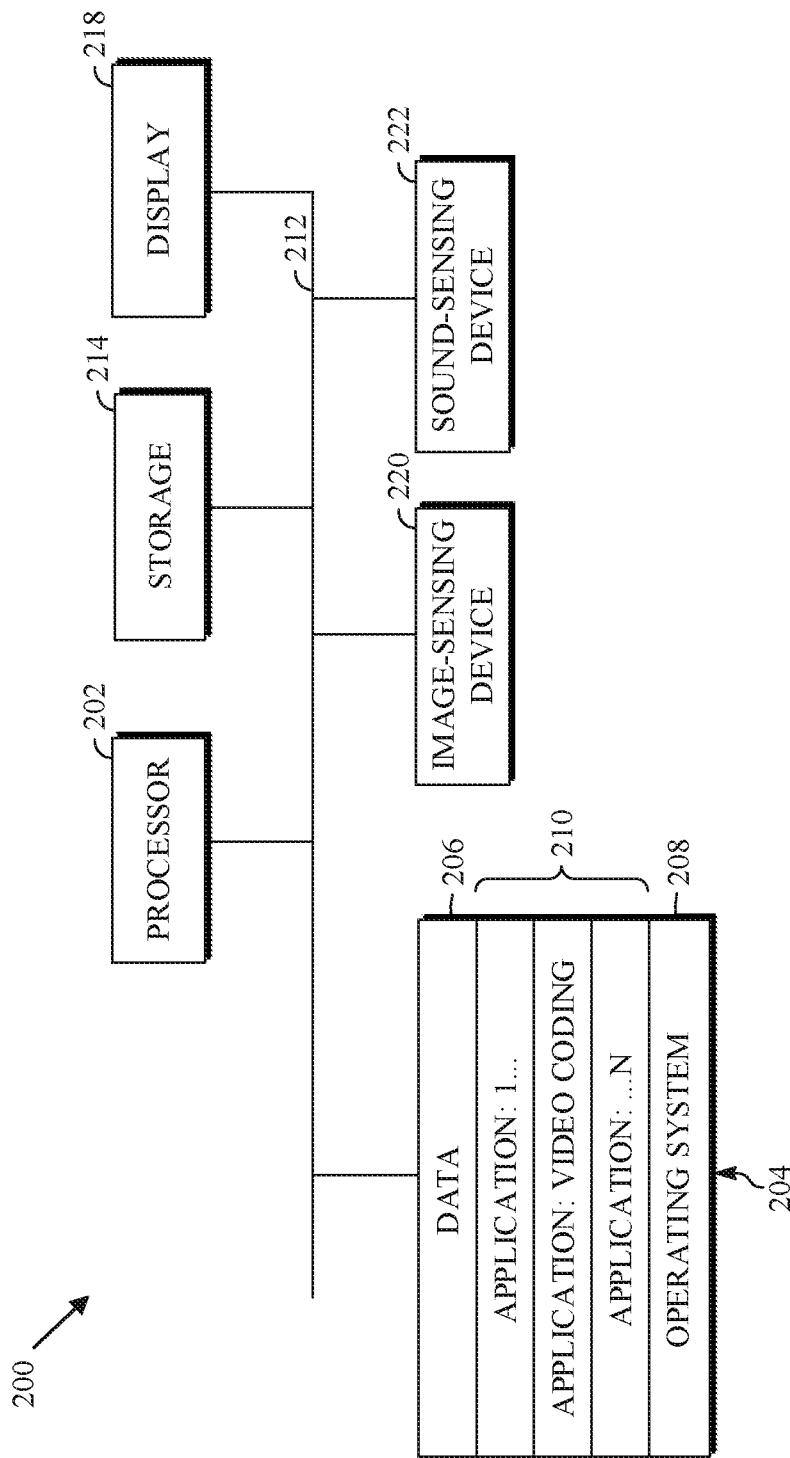
FIG. 2 is a diagram of a computing and communications system in accordance with implementations of this disclosure.

In one example, the receiving station 106 can be a computer having an internal configuration of hardware, such as that described with respect to FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP, e.g., a Hypertext Transfer Protocol-based (HTTP-based) video streaming protocol may be used.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, now existing or hereafter developed, capable of manipulating or processing information. Although the disclosed implementations can be practiced with a single processor as shown (e.g., the CPU 202), advantages in speed and efficiency can be achieved by using more than one processor.

In an implementation, a memory 204 in the computing device 200 can be a read-only memory (ROM) device or a random-access memory (RAM) device. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described herein. For example, the application programs 210 can include applications 1 through N, which further include a video coding application that performs the methods described herein. The computing device 200 can also include a secondary storage 214, which can, for example, be a memory card used with a computing device, such as the computing device 200, that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD); a cathode-ray tube (CRT) display; or a light-emitting diode (LED) display, such as an organic LED (OLED) display.

The computing device 200 can also include or be in communication with an image-sensing device 220, for example, a camera, or any other image-sensing device, now existing or hereafter developed, that can sense an image, such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device, now existing or hereafter developed, that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly to or across a local area or other network. The memory 204 can be distributed across multiple machines, such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit, such as a memory card, or multiple units, such as multiple memory cards. The computing device 200 can thus be implemented in a wide variety of configurations.

Figure 3:
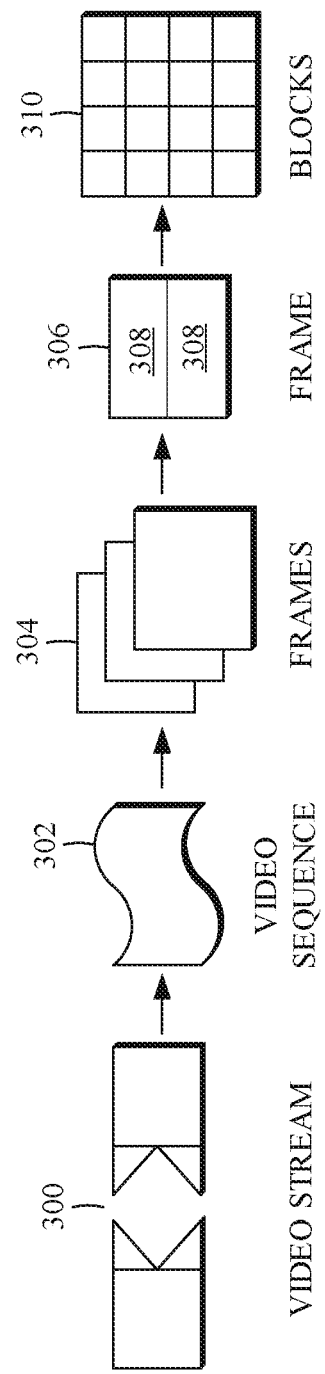
FIG. 3 is a diagram of a video stream for use in encoding and decoding in accordance with implementations of this disclosure.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size, such as 4×4 pixels, 8×8 pixels, 16×8 pixels, 8×16 pixels, 16×16 pixels, or larger.

Figure 4:
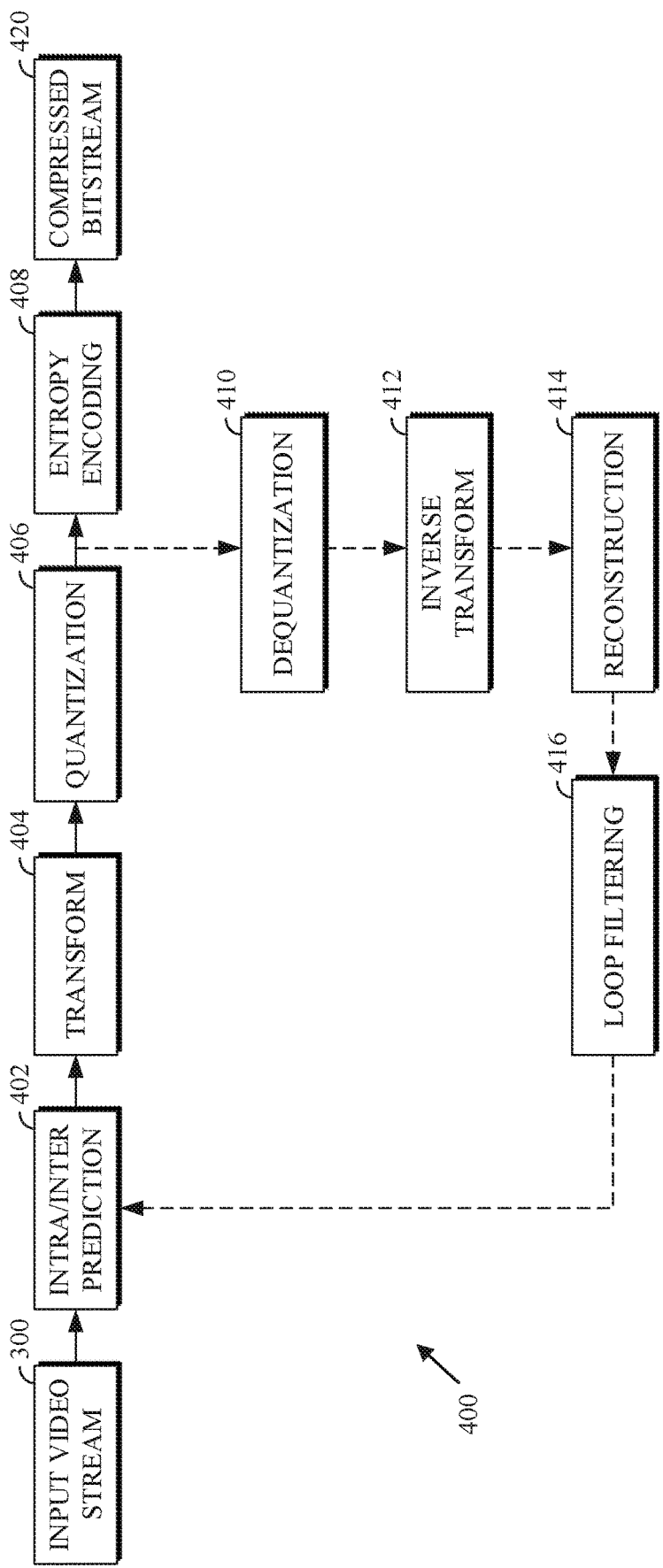
FIG. 4 is a block diagram of an encoder in accordance with implementations of this disclosure.

FIG. 4 is a block diagram of an encoder 400 in accordance with implementations of this disclosure. The encoder 400 can be implemented, as described above, in the transmitting station 102, such as by providing a computer software program stored in memory, for example, the memory 204. The computer software program can include machine instructions that, when executed by a processor, such as the CPU 202, cause the transmitting station 102 to encode video data in the manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter-prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter-prediction stage 402, a block can be encoded using intra-frame prediction (also called intra-prediction) or inter-frame prediction (also called inter-prediction), or a combination of both. In any case, a prediction block can be formed. In the case of intra-prediction, all or part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter-prediction stage 402 to produce a residual block (also called a residual). The transform stage 404 transforms the residual into transform coefficients in, for example, the frequency domain using block-based transforms. Such block-based transforms (i.e., transform types) include, for example, the Discrete Cosine Transform (DCT) and the Asymmetric Discrete Sine Transform (ADST). Other block-based transforms are possible. Further, combinations of different transforms may be applied to a single residual. In one example of the application of a transform, the DCT transforms the residual block into the frequency domain where the transform coefficient values are based on spatial frequency. The lowest frequency (DC) coefficient is at the top-left of the matrix, and the highest frequency coefficient is at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block (which may include, for example, the type of prediction used, transform type, motion vectors, and quantizer value), are then output to the compressed bitstream 420. The information to decode the block may be entropy coded into block, frame, slice, and/or section headers within the compressed bitstream 420. The compressed bitstream 420 can also be referred to as an encoded video stream or encoded video bitstream; these terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process and that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter-prediction stage 402 can be added to the derivative residual to create a reconstructed block. The loop filtering stage 416 can be applied to the reconstructed block to reduce distortion, such as blocking artifacts.

Other variations of the encoder 400 can be used to encode the compressed bitstream 420. For example, a non-transform-based encoder 400 can quantize the residual signal directly without the transform stage 404 for certain blocks or frames. In another implementation, an encoder 400 can have the quantization stage 406 and the dequantization stage 410 combined into a single stage.

Figure 5:
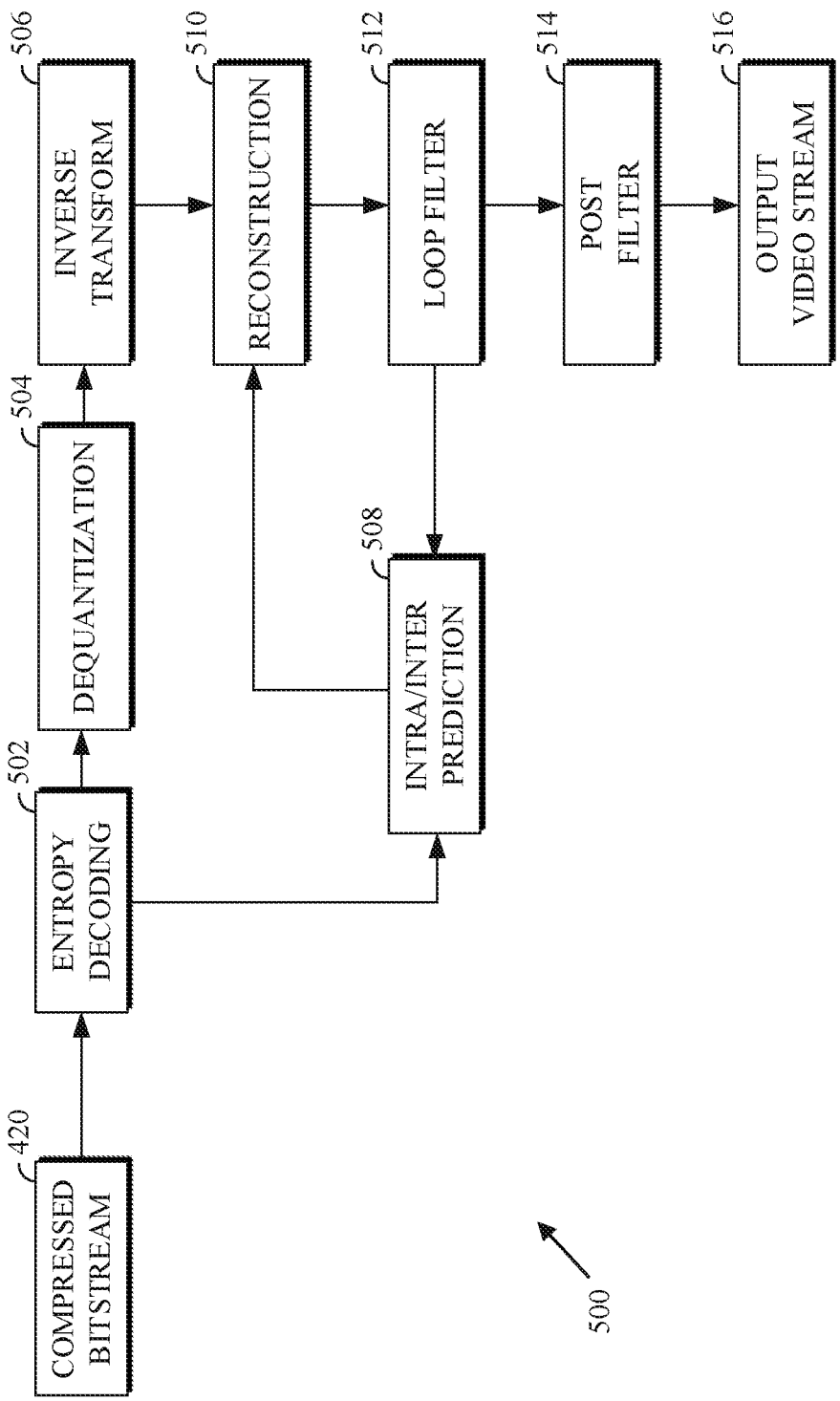
FIG. 5 is a block diagram of a decoder in accordance with implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor, such as the CPU 202, cause the receiving station 106 to decode video data in the manners described below. The decoder 500 can also be implemented in hardware included in, for example, the transmitting station 102 or the receiving station 106.

The decoder 500, similar to the reconstruction path of the encoder 400 discussed above, includes in an example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512, and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, for example, at the intra/inter-prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the post filtering stage 514 is applied to the reconstructed block to reduce blocking distortion, and the result is output as the output video stream 516. The output video stream 516 can also be referred to as a decoded video stream; these terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied after the loop filtering stage 512. The loop filtering stage 512 can include an optional deblocking filtering stage. Additionally, or alternatively, the encoder 400 includes an optional deblocking filtering stage in the loop filtering stage 416.

A codec can use multiple transform types. For example, a transform type can be the transform type used by the transform stage 404 of FIG. 4 to generate the transform block. For example, the transform type (i.e., an inverse transform type) can be the transform type to be used by the dequantization stage 504 of FIG. 5. Available transform types can include a one-dimensional Discrete Cosine Transform (1D DCT) or its approximation, a one-dimensional Discrete Sine Transform (1D DST) or its approximation, a two-dimensional DCT (2D DCT) or its approximation, a two-dimensional DST (2D DST) or its approximation, and an identity transform. Other transform types can be available. In an example, a one-dimensional transform (1D DCT or 1D DST) can be applied in one dimension (e.g., row or column), and the identity transform can be applied in the other dimension.

In the cases where a 1D transform (e.g., 1D DCT, 1D DST) is used (e.g., 1D DCT is applied to columns (or rows, respectively) of a transform block), the quantized coefficients can be coded by using a row-by-row (i.e., raster) scanning order or a column-by-column scanning order. In the cases where 2D transforms (e.g., 2D DCT) are used, a different scanning order may be used to code the quantized coefficients. As indicated above, different templates can be used to derive contexts for coding the non-zero flags of the non-zero map based on the types of transforms used. As such, in an implementation, the template can be selected based on the transform type used to generate the transform block. As indicated above, examples of a transform type include: 1D DCT applied to rows (or columns) and an identity transform applied to columns (or rows); 1D DST applied to rows (or columns) and an identity transform applied to columns (or rows); 1D DCT applied to rows (or columns) and 1D DST applied to columns (or rows); a 2D DCT; and a 2D DST. Other combinations of transforms can comprise a transform type.

Figure 6:
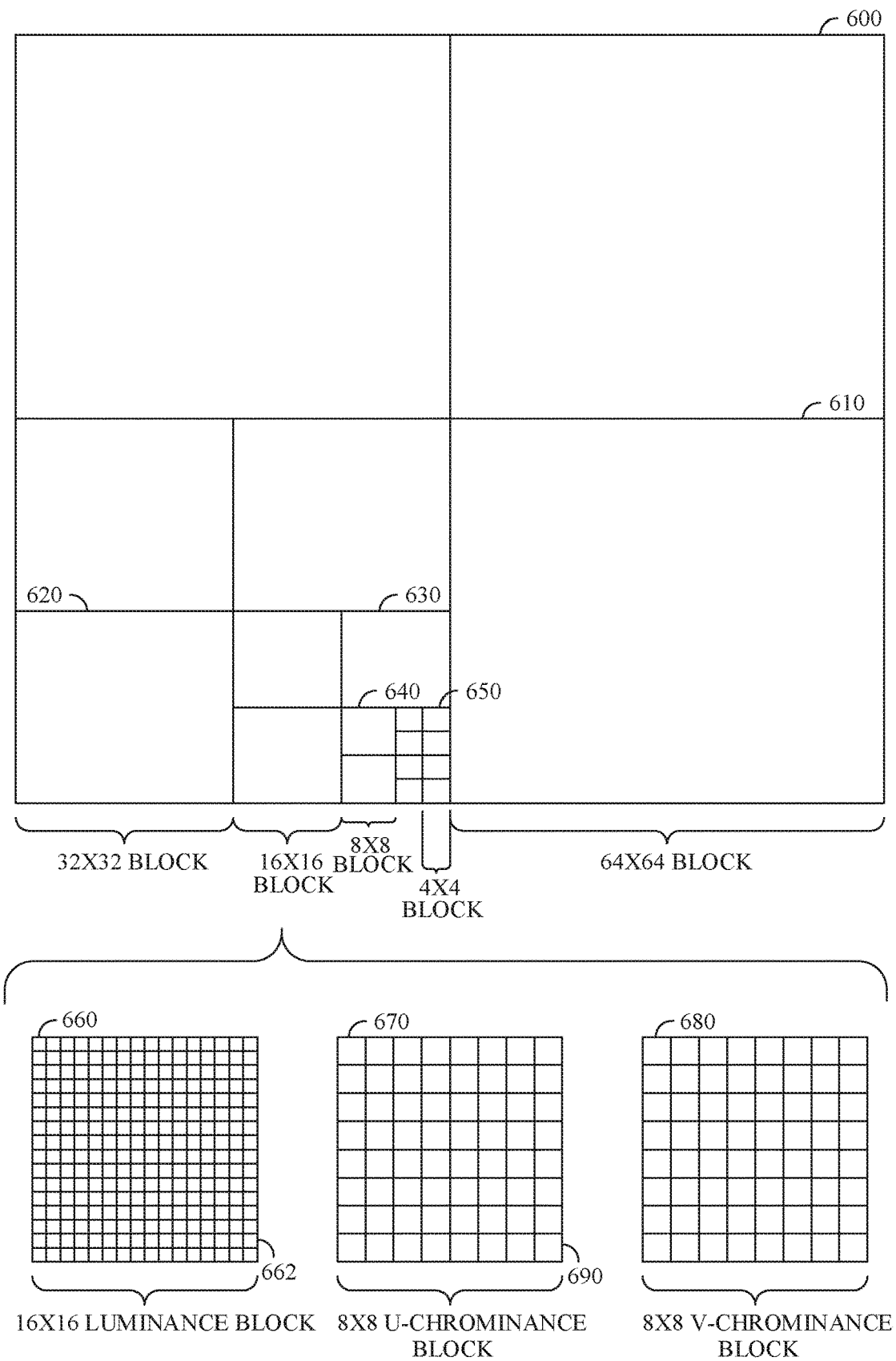
FIG. 6 is a block diagram of a representation of a portion of a frame in accordance with implementations of this disclosure.

FIG. 6 is a block diagram of a representation of a portion 600 of a frame, such as the frame 306 of FIG. 3, according to implementations of this disclosure. As shown, the portion 600 of the frame includes four 64×64 blocks 610, which may be referred to as superblocks, in two rows and two columns in a matrix or Cartesian plane. A superblock can have a larger or a smaller size. While FIG. 6 is explained with respect to a superblock of size 64×64, the description is easily extendable to larger (e.g., 128×128) or smaller superblock sizes.

In an example, and without loss of generality, a superblock can be a basic or maximum coding unit (CU). Each superblock can include four 32×32 blocks 620. Each 32×32 block 620 can include four 16×16 blocks 630. Each 16×16 block 630 can include four 8×8 blocks 640. Each 8×8 block 640 can include four 4×4 blocks 650. Each 4×4 block 650 can include 16 pixels, which can be represented in four rows and four columns in each respective block in the Cartesian plane or matrix. The pixels can include information representing an image captured in the frame, such as luminance information, color information, and location information. In an example, a block, such as a 16×16-pixel block as shown, can include a luminance block 660, which can include luminance pixels 662; and two chrominance blocks 670/680, such as a U or Cb chrominance block 670, and a V or Cr chrominance block 680. The chrominance blocks 670/680 can include chrominance pixels 690. For example, the luminance block 660 can include 16×16 luminance pixels 662, and each chrominance block 670/680 can include 8×8 chrominance pixels 690, as shown. Although one arrangement of blocks is shown, any arrangement can be used. Although FIG. 6 shows N×N blocks, in some implementations, N×M, where N≠M, blocks can be used. For example, 32×64 blocks, 64×32 blocks, 16×32 blocks, 32×16 blocks, or any other size blocks can be used. In some implementations, N×2N blocks, 2N×N blocks, or a combination thereof can be used.

In some implementations, coding (i.e., image or video coding) can include ordered block-level coding. Ordered block-level coding can include coding blocks of a frame in an order, such as raster-scan order, wherein blocks can be identified and processed starting with a block in the upper left corner of the frame, or a portion of the frame, and proceeding along rows from left to right and from the top row to the bottom row, identifying each block in turn for processing. For example, the superblock in the top row and left column of a frame can be the first block coded, and the superblock immediately to the right of the first block can be the second block coded. The second row from the top can be the second row coded, such that the superblock in the left column of the second row can be coded after the superblock in the rightmost column of the first row.

In an example, coding a block can include using quad-tree coding, which can include coding smaller block units with a block in raster-scan order. The 64×64 superblock shown in the bottom-left corner of the portion of the frame shown in FIG. 6, for example, can be coded using quad-tree coding in which the top-left 32×32 block can be coded, then the top-right 32×32 block can be coded, then the bottom-left 32×32 block can be coded, and then the bottom-right 32×32 block can be coded. Each 32×32 block can be coded using quad-tree coding in which the top-left 16×16 block can be coded, then the top-right 16×16 block can be coded, then the bottom-left 16×16 block can be coded, and then the bottom-right 16×16 block can be coded. Each 16×16 block can be coded using quad-tree coding in which the top-left 8×8 block can be coded, then the top-right 8×8 block can be coded, then the bottom-left 8×8 block can be coded, and then the bottom-right 8×8 block can be coded. Each 8×8 block can be coded using quad-tree coding in which the top-left 4×4 block can be coded, then the top-right 4×4 block can be coded, then the bottom-left 4×4 block can be coded, and then the bottom-right 4×4 block can be coded. In some implementations, 8×8 blocks can be omitted for a 16×16 block, and the 16×16 block can be coded using quad-tree coding in which the top-left 4×4 block can be coded, and then the other 4×4 blocks in the 16×16 block can be coded in raster-scan order.

In an example, video coding can include compressing the information included in an original (e.g., input, source, etc.) frame by omitting some of the information in the original frame from a corresponding encoded frame. For example, coding can include reducing spectral redundancy, reducing spatial redundancy, reducing temporal redundancy, or a combination thereof.

In an example, reducing spectral redundancy can include using a color model based on a luminance component (Y) and two chrominance components (U and V or Cb and Cr), which can be referred to as the YUV or YCbCr color model or color space. Using the YUV color model can include using a relatively large amount of information to represent the luminance component of a portion of a frame and using a relatively small amount of information to represent each corresponding chrominance component for the portion of the frame. For example, a portion of a frame can be represented by a high-resolution luminance component, which can include a 16×16 block of pixels, and by two lower resolution chrominance components, each of which representing the portion of the frame as an 8×8 block of pixels. A pixel can indicate a value (e.g., a value in the range from 0 to 255) and can be stored or transmitted using, for example, eight bits. Although this disclosure is described with reference to the YUV color model, any color model can be used.

Reducing spatial redundancy can include transforming a block into the frequency domain as described above. For example, a unit of an encoder, such as the entropy encoding stage 408 of FIG. 4, can perform a DCT using transform coefficient values based on spatial frequency.

Reducing temporal redundancy can include using similarities between frames to encode a frame using a relatively small amount of data based on one or more reference frames, which can be previously encoded, decoded, and reconstructed frames of the video stream.

Figure 7:
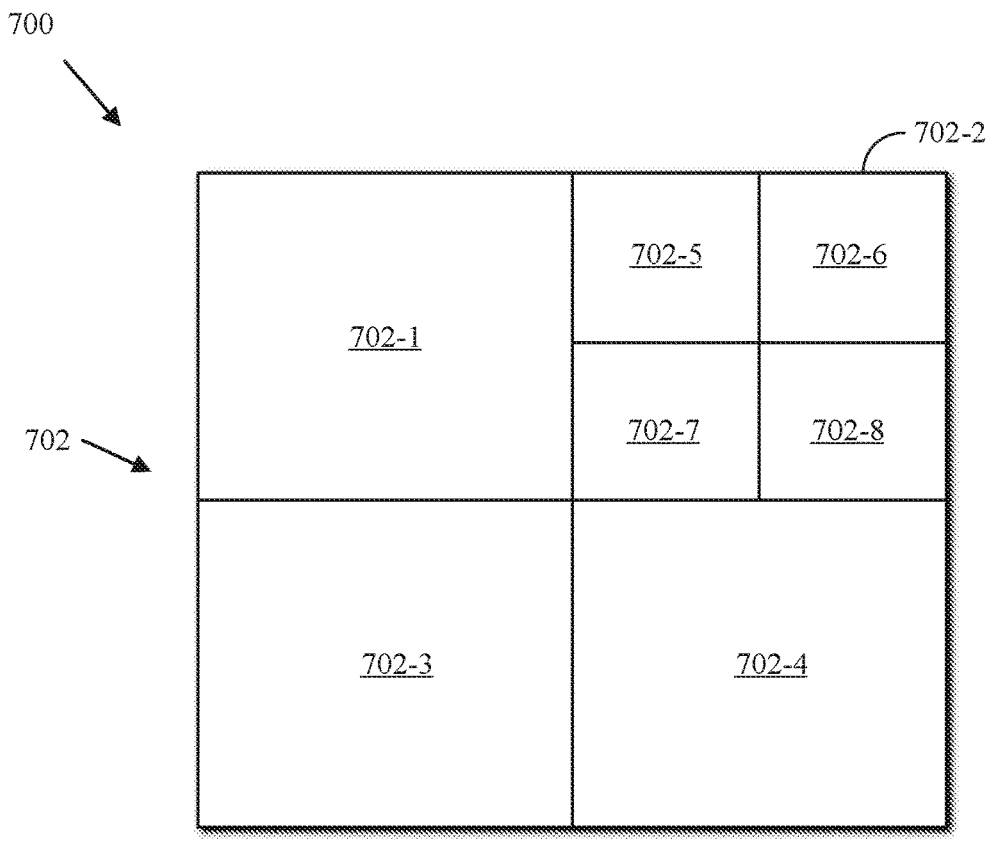
FIG. 7 is a flowchart of a technique for partitioning a block of an image to reduce quantization artifacts according to an implementation of this disclosure.
Figure 7:
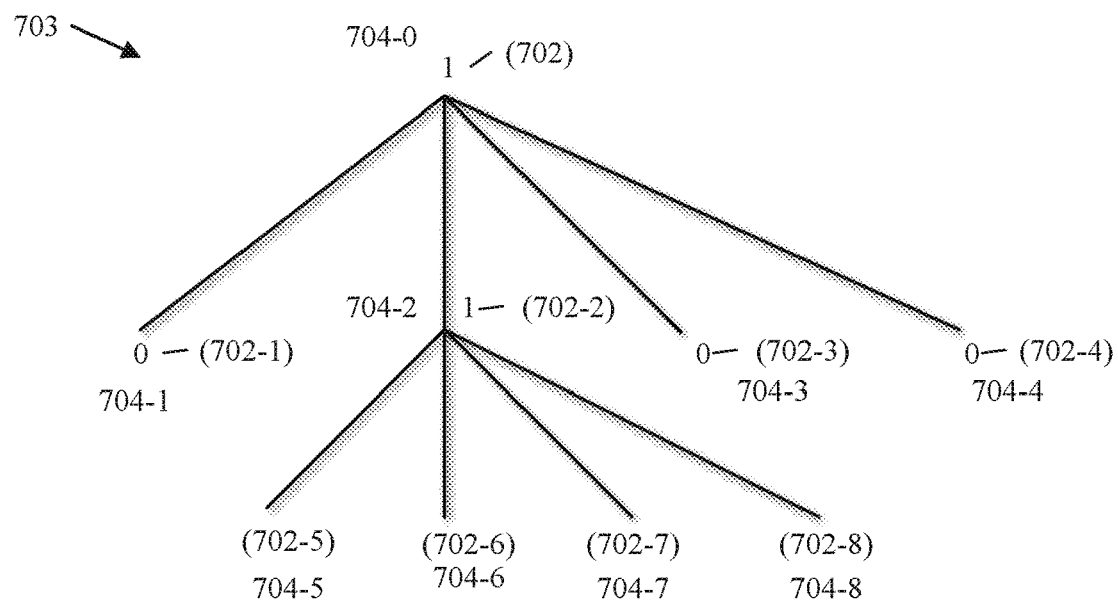

As mentioned above, a superblock can be coded using quad-tree coding. FIG. 7 is a block diagram of an example 700 of a quad-tree representation of a block according to implementations of this disclosure. The example 700 includes the block 702. As mentioned above, the block 702 can be referred to as a superblock or a CTB. The example 700 illustrates a partition of the block 702. However, the block 702 can be partitioned differently, such as by an encoder (e.g., the encoder 400 of FIG. 4).

The example 700 illustrates that the block 702 is partitioned into four blocks, namely, the blocks 702-1, 702-2, 702-3, and 702-4. The block 702-2 is further partitioned into the blocks 702-5, 702-6, 702-7, and 702-8. As such, if, for example, the size of the block 702 is N×N (e.g., 128×128), then the blocks 702-1, 702-2, 702-3, and 702-4 are each of size N/2×N/2 (e.g., 64×64), and the blocks 702-5, 702-6, 702-7, and 702-8 are each of size N/4×N/4 (e.g., 32×32). If a block is partitioned, it is partitioned into four equally sized, non-overlapping square sub-blocks.

A quad-tree data representation is used to describe how the block 702 is partitioned into sub-blocks, such as blocks 702-1, 702-2, 702-3, 702-4, 702-5, 702-6, 702-7, and 702-8. A quad-tree 703 of the partition of the block 702 is shown. Each node of the quad-tree 703 is assigned a flag of "1" if the node is further split into four sub-nodes and assigned a flag of "0" if the node is not split. The flag can be referred to as a split bit (e.g., 1) or a stop bit (e.g., 0) and is coded in a compressed bitstream. In a quad-tree, a node either has four child nodes or has no child nodes. A node that has no child nodes corresponds to a block that is not split further. Each of the child nodes of a split block corresponds to a sub-block.

In the quad-tree 703, each node corresponds to a sub-block of the block 702. The corresponding sub-block is shown between parentheses. For example, a node 704-1, which has a value of 0, corresponds to the block 702-1.

A root node 704-0 corresponds to the block 702. As the block 702 is split into four sub-blocks, the value of the root node 704-0 is the split bit (e.g., 1). At an intermediate level, the flags indicate whether a sub-block of the block 702 is further split into four sub-sub-blocks. In this case, a node 704-2 includes a flag of "1" because the block 702-2 is split into the blocks 702-5, 702-6, 702-7, and 702-8. Each of nodes 704-1, 704-3, and 704-4 includes a flag of "0" because the corresponding blocks are not split. As nodes 704-5, 704-6, 704-7, and 704-8 are at a bottom level of the quad-tree, no flag of "0" or "1" is necessary for these nodes. That the blocks 702-5, 702-6, 702-7, and 702-8 are not split further can be inferred from the absence of additional flags corresponding to these blocks.

The quad-tree data representation for the quad-tree 703 can be represented by the binary data of "10100," where each bit represents a node 704 of the quad-tree 703. The binary data indicates the partitioning of the block 702 to the encoder and decoder. The encoder can encode the binary data in a compressed bitstream, such as the compressed bitstream 420 of FIG. 4, in a case where the encoder needs to communicate the binary data to a decoder, such as the decoder 500 of FIG. 5.

The blocks corresponding to the leaf nodes of the quad-tree 703 can be used as the bases for prediction. That is, prediction can be performed for each of the blocks 702-1, 702-5, 702-6, 702-7, 702-8, 702-3, and 702-4, referred to herein as coding blocks. As mentioned with respect to FIG. 6, the coding block can be a luminance block or a chrominance block. It is noted that, in an example, the superblock partitioning can be determined with respect to the luminance blocks. The same partition can be used with the chrominance blocks.

A prediction type (e.g., intra- or inter-prediction mode) is determined at the coding block (e.g., a block 702-1, 702-5, 702-6, 702-7, 702-8, 702-3, or 702-4) level. That is, a coding block is the decision point for prediction.

In some implementations, block based coding efficiency may be improved by partitioning a current residual block into one or more transform partitions, which may be rectangular, including square, partitions for transform coding. For example, a current residual block, such as block 610, may be a 64×64 block and may be transformed without partitioning using a 64×64 transform. In an example, the current residual block, such as block 610, may be a 32×32 block and may be transformed without partitioning using a 32×32 transform.

Although not expressly shown in FIG. 6, a residual block may be transform partitioned into transform sub-blocks. For example, a 64×64 residual block may be transform partitioned into four 32×32 transform blocks, including sixteen 16×16 transform blocks, using a transform partitioning scheme including sixty-four 8×8 transform blocks, or using a uniform transform partitioning scheme including 256 4×4 transform blocks.

In some implementations, video coding using the bicriteria block splitting heuristic can include identifying transform block sizes for a residual block. In some implementations, transform partition coding may include recursively determining whether to transform a current block using a current block size transform or by partitioning the current block and transform partition coding each partition.

For example, the bottom left block 610 shown in FIG. 6 may be a 64×64 residual block, and transform partition coding may include determining whether to code the current 64×64 residual block using a 64×64 transform or to code the 64×64 residual block by partitioning the 64×64 residual block into partitions, such as four 32×32 sub-blocks 620, and transform partition coding each partition. In an example, the partitions can be one of the four 32×32 blocks 620, two 64×32 blocks, or two 32×64 blocks. Whether to partition the 64×64 can be based on whether the splitting indicator value indicates that the block should be partitioned. The splitting indicator value, as described above and as further described below, can combine a cost (in bits) of coding the block and the visual masking properties of the block. In an example, the splitting indicator value can be a ratio of the cost and visual masking properties. In an example, the ratio can be compared to a constant that is empirically derived. If the ratio is smaller than the constant, then the block is split.

In some implementations, determining a transform partition of a current transform block can be based on evaluating a respective splitting indicator value of sibling partitions. For example, if the splitting indicator value of an N×N transform block indicates that the block should be split. The possible transform partitions may be a four N/2×N/2 partition (i.e., a first partition, a transform partition including four N/2×N/2 transform sub-blocks), two N/2×N partition (i.e., a second partition, a transform partition including two N/2×N transform sub-blocks), or a two N×N/2 partition (i.e., a third partition, a transform partition including two N/2×N/2 transform sub-blocks). A first, second, and third splitting indicator value can be calculated for the first transform partition, the second transform partition, and the third transform partition, respectively. The transform partition corresponding to the best of the respective splitting indicator values can then be selected. The splitting indicator value of a transform partition can be an aggregate of the splitting indicator values of the transform sub-blocks of the transform partition. The aggregate can be the sum, the maximum, or some other aggregate of the splitting indicator values of the transform sub-blocks of the partition.

In an example, a splitting indicator value can be determined for a current block (i.e., a current transform block) and respective splitting indications values can be determined for each of the current block's possible transform partitions. If the splitting indicator value of the current transform block is better than those of the child partitions, then the current block is not split; otherwise, the current block is split according to the partition having the smallest (e.g., best) splitting indicator value.

To illustrate, for the bottom-left 64×64 block 610 shown, the splitting indicator values for encoding the 64×64 block 610 using a 64×64 size transform may indicate that the bottom-left 64×64 block 610 should be split. Thus, the aggregate of the splitting indicator values for encoding four 32×32 sub-blocks 620 using 32×32 transforms are determined. The splitting indicator value for encoding the top left 32×32 sub-block 620 using a 32×32 transform may indicate that the top left 32×32 sub-block 620 should not be split, and the top left 32×32 sub-block 620 may be coded using a 32×32 transform. Similarly, the splitting indicator value for encoding the top right 32×32 sub-block 620 using a 32×32 transform may be less than a sum of the cost for encoding the top right 32×32 sub-block 620 using four 16×16 transforms, and the top right 32×32 sub-block 620 may be coded using a 32×32 transform. Similarly, the splitting indicator value for encoding the bottom left 32×32 sub-block 620 using a 32×32 transform may be less than an aggregate of the splitting indicator values for encoding the bottom left 32×32 sub-block 620 using four 16×16 transforms, and the bottom left 32×32 sub-block 620 may be coded using a 32×32 transform. The splitting indicator value for encoding the bottom right 32×32 sub-block 620 using a 32×32 transform may exceed an aggregate of the splitting indicator values for encoding the bottom right 32×32 sub-block 620 using four 16×16 transforms, and the bottom right 32×32 sub-block 620 may be partitioned into four 16×16 sub-blocks 630, and each 16×16 sub-block 630 may be coded using multiform transform partition coding.

Figure 8:
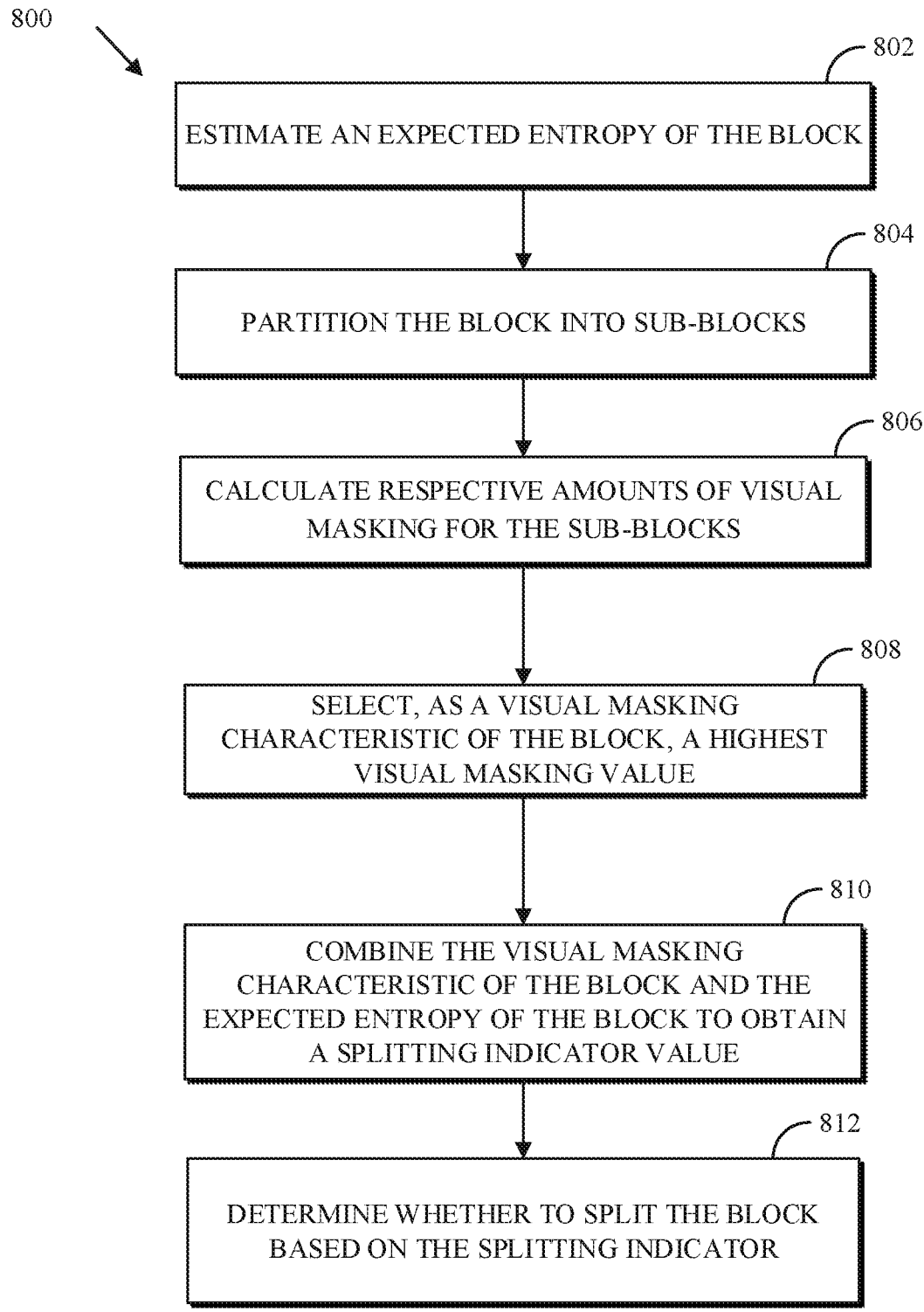
FIG. 8 is a flowchart of a technique for partitioning a block of an image to reduce quantization artifacts according to an implementation of this disclosure.

FIG. 8 is a flowchart of a technique 800 for partitioning a block of an image to reduce quantization artifacts according to an implementation of this disclosure. The technique 800 determines whether the block should be transform partitioned using the bicriteria block splitting heuristic. A first criterion estimates an expected entropy, and a second criterion is an estimate of the impact of the artifacts in a sub-block on neighboring sub-blocks of the block. The technique 800 determines whether the block is to be transformed to the frequency domain using a transform having a size of the block or whether the block should be partitioned into smaller sub-blocks and each of the sub-blocks is transformed separately using a transform having a size of that sub-block or by being further partitioned using the technique 800.

The image can be a single image or a frame of a video sequence. The block includes pixels, and each pixel has a corresponding pixel value. The pixel value can be a luminance Y value, a chrominance U value, a chrominance V value, or other color component value. In an example, the block can be a largest coding block size (e.g., a superblock, a macroblock, etc.). In an example, the largest coding block size can be of size 32×32, 64×64, 128×128, smaller, or larger. In an example, the block can be a smaller sub-block of the largest coding block. To illustrate, the block can be a 16×16, 32×16, 16×32, 8×16, 16×8, or some other sub-block of a 32×32 largest coding block size.

The technique 800 can be implemented, for example, as a software program that may be executed by computing devices, such as the computing and the transmitting station 102 or the receiving station 106 of FIG. 1. The software program can include machine-readable instructions that may be stored in a memory, such as the memory 204, and that, when executed by a processor, such as the CPU 202, can cause the computing device to perform the technique 800.

The technique 800 can be implemented in or by an encoder. Operations of the technique 800 can be implemented in whole or in part in the transform stage 404, the dequantization stage 410, the inverse transform stage 412, the reconstruction stage 414, other units, or any combination thereof of the encoder 400 of FIG. 4.

The technique 800 can be implemented using specialized hardware or firmware. Multiple processors, memories, or both, may be used.

At 802, the technique 800 estimates an expected entropy of the block. The technique 800 can estimate the expected entropy needed to have the specified quality in the block. The expected entropy of the block can be approximated as described below.

In an example, the technique 800 can compute the Laplacians of the pixels in the block and take the maximum absolute value. The maximum absolute Laplacian value can be used as the estimate of the expected entropy. As such, estimating 802 the expected entropy of the block can include determining respective Laplacians for pixels of the block and selecting a maximum of the absolute Laplacians as the expected entropy of the block.

The Laplacian can be indicative of the high-frequency energy in the block. Statistically, the high-frequency energy in the block can map into at least most of the high-frequency elements (i.e., transform coefficient locations) of the transform block. When there is energy in the high-frequency elements, then the values (i.e., the transform coefficient values) at those high-frequency elements (i.e., at the transform coefficient locations) are non-zero. When the high-frequency elements of a transform (e.g., the DCT transform) are not zero, storing those transform coefficient values can be expensive (in terms of bits in the compressed bitstream). To reiterate, the Laplacian can signal the highest frequency elements of the transform (e.g., the DCT transform).

Figure 9:
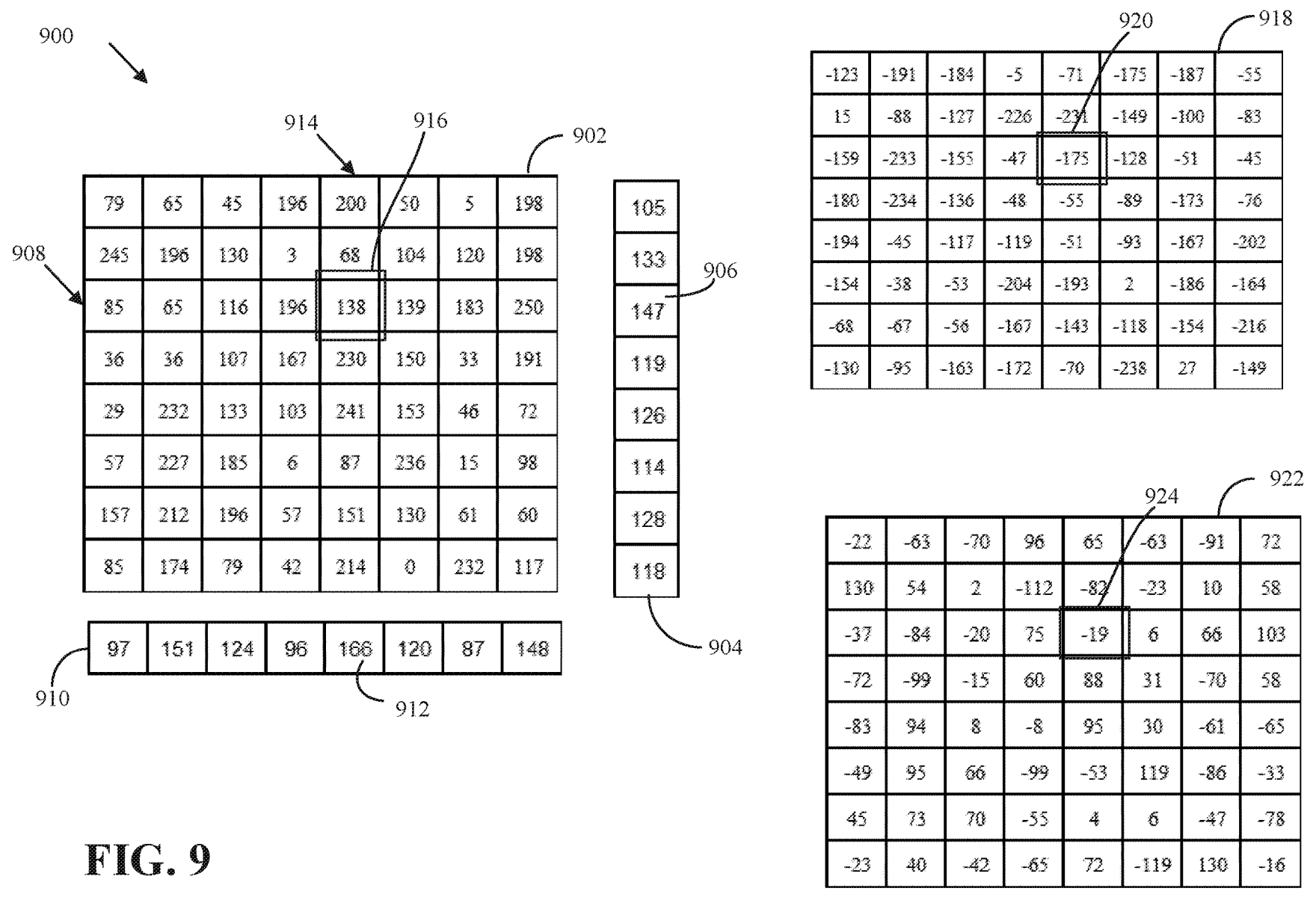

FIG. 9 is an example 900 of calculating Laplacians according to implementations of this disclosure. For brevity, calculating Laplacians is described with respect to a block 902 that is of size 8×8. However, the block can be of any rectangular, including square, size. The block 902 can be a luminance block, a chrominance block, or some other color component block. In an example, where the block is a luminance block, the pixel values of the block can be represented by 8-bit values. As such, the pixel values of the block 902 can be in the range [0.255].

In an example, determining the respective Laplacians for pixels of the block can include, for a pixel in a row and a column of the block, subtracting from the pixel a first value that is a first function of a first average of all pixels of the row and subtracting from the pixel a second value that is a second function of a second average of all pixels of the column. For example, for each pixel that is at a location (x, y) of the block 902, a function of the average pixel value of the column x and a function of the average pixel value of the row y are subtracted from the pixel value at the location (x, y). The Laplacian of a pixel (i.e., a pixel value) can be thought of as subtracting from the pixel the pixel's neighbors' average value from the pixel. This can be equivalent to applying a high-pass filter to the pixel. The Laplacians of all the pixels of the block 902 is a block (e.g., a Laplacian block 918 or a Laplacian block 922) that describes the rapid changes in the block 902.

Row averages 904 is a column vector that includes the per-row averages of the block 902. The row averages can be rounded to the nearest integer. For example, an average 906 (i.e., 147) is the average pixel value of a row 908. Thus, the average 906 is calculated as round((85+65+116+196+138+139+183+250)/8)=147. Column averages 910 is a row vector that includes the per-column averages of the block 902. The column averages can be rounded to the nearest integer. For example, an average 912 (i.e., 166) is the average pixel value of a column 914. Thus, the average 912 is calculated as round((200+68+138+230+241+87+151+214)/8)=166.

In an example, the function can be a unitary function. The unitary function herein means that an average value is taken as is or is multiplied by 1. Thus, a Laplacian 920 of a pixel 916 is calculated in the Laplacian block 918 as round(138−147−166)=−175). In an example, the function can include multiplying the average by ½. Thus, a Laplacian 924 of the pixel 916 is calculated in the Laplacian block 922 as round(138−147/2−166/2)=−19). It is noted that by subtracting half of the averages away, the integral (i.e., the sum of the values in the Laplacian block 922) will have practically zero impact. That is, the sum of the values is very close to zero. Subtracting half of the averages has been shown to give good results. However, it is possible to subtract other fractional values. The function of the averages can be other than the unitary function of the ½ function.

If the row and column averages are not removed from the pixels of the block, then a not-an-insignificant amount of entropy weight may be put for the first row and the first column of the DCT (i.e., the transform block) because those average values can map in the first row and first column of the transform block. To restate, removing the horizontal and vertical integrals (i.e., the row and column averages) from the pixels can allow for a more realistic entropy estimate as these integrals project to the first row and column and are less total entropy than other high-frequency elements.

To illustrate further, assume that the image is of the horizon, where above the horizon is the sky and below the horizon is a lake. As such, in a single block (e.g., a 3×32 bloc) there may be a single line defining the division between the sky and the lake). When such a block is transformed using a 32×32 DCT, which includes 1,024 elements, it is a lot of data to store. However, by removing the averages, only the horizon (i.e., a line) remains and the integral transform would not use all of the 32×32 elements. The transform only uses 32 elements: the transform only puts all the values on either the first column (for horizontal lines, such as the described horizon) or the first row (for vertical lines). As such, significantly less entropy (and data to be stored) results. Thus, to reduce the entropy in the estimation of the Laplacians, the horizontal and vertical integrals can be removed.

The maximum absolute value of the Laplacian block can be used as the expected entropy.

Returning to FIG. 8, in an example, estimating 802 the expected entropy of the block can include using a hypothetical encoder to encode the block and using a number of bits resulting from the hypothetical encoding as the expected entropy of the block. A hypothetical encoding process is a process that carries out the coding steps but does not output bits into the compressed bitstream. Since the purpose is to estimate a bitrate (or a sample rate), a hypothetical encoding process may be regarded or called a rate estimation process. The hypothetical encoding process computes the number of bits required to encode the region. In another example, the expected entropy of the block can be estimated (e.g., approximated) using a heuristic that is known to correlate positively with an eventual entropy calculation for the block. For example, the Shannon entropy of the block can be calculated.

At 804, the technique 800 partitions the block into sub-blocks. Each sub-block can have the size of a smallest possible partition size. In an example, the smallest possible partition size for the luminance block can be 8×8. In an example, the smallest possible partition size for the luminance block can be 5×5. In an example, the smallest possible partition size for chrominance blocks can be 4×4. A block having the smallest possible partition size cannot be partitioned further, for transform partitioning purposes, at least.

At 806, the technique 800 calculates respective amounts of visual masking for the sub-blocks. That is, for each of the sub-blocks, the technique 800 calculates an amount of visual masking. That is, the technique 800 estimates (e.g., approximates, correlates, etc.) how easily visible would an artifact be in a reconstructed sub-block.

For each of the sub-blocks, the technique 800 can compute an integral of all pixels in a sub-block using formula (1)

$$1/(1+x*x/(C*C)). \quad (1)$$

In formula (1), x represents (e.g., indicates, describes, etc.) the local delta; and C, a constant, denotes the amount of the local delta that is expected to be present when compressing the sub-block at a current quality. The "local delta" refers to differences between neighboring pixels. For example, the local delta can be the amplitude of the Laplacian. In an example, when calculating the integral of all pixels in a sub-block using the formula (1), x can be the maximum absolute Laplacian in the sub-block. In another example, x can be calculated as the sum of all the Laplacians of the sub-block.

The integral value can be compared to an empirically determined threshold (e.g., 5, or some other value). The empirically determined threshold can be derived using an optimization technique, such as the Nelder-Mead optimization technique. A high value of the integral can indicate that not many pixels in that sub-block will participate in visual masking. As such, any artifacts from neighboring sub-blocks that propagate to the sub-block are likely to be visible.

In another example, the constant C can be a multiple of the butteraugli limit of a sub-block. The butteraugli limit estimates the psycho-visual similarity of two images. It gives a score for the images that is reliable in the domain of barely noticeable differences, and computes a spatial map of the level of differences. The butteraugli limit can be used as a quality target for lossy image and video compression. The butteraugli can be used as a quality evaluator (i.e., metric); however, the exact value of the butteraugli limit can be used to define a quality target for lossy image and video compression. Thus, the butteraugli limit can be an estimate of the quality difference between a source sub-block (e.g., a pre-encoding sub-block) and the reconstructed sub-block (e.g., a post-decoding sub-block). A tool for calculating the butteraugli limit can be obtained from https://opensource.google/projects/butteraugli. The butteraugli limit is an objective image quality assessment metric. It assigns a differential mean opinion score (DMOS) value to the difference between an original image and a degraded version. To reiterate, the constant C can be calculated as multiple of the quality of a sub-block. The quality of the sub-block can be defined as a number of multiples of just noticeable differences in the sub-block. That is, the constant C can be a multiple of the butteraugli limit.

C is a constant that depends on a desired (e.g., selected, etc.) quality level. As is known, a target quality level is typically specified when encoding an image. Thus, C can be related to the target quality level. As is known, a lower quality results in fewer bits in the compressed bitstream than a higher target quality. The quality level can be or can be specified as the quantization parameter, QP. Thus, the constant C can be a function of the QP. In an example, C can be a linear function (e.g., a multiple) of the QP.

At 808, the technique 800 selects, as a visual masking characteristic of the block, a highest visual masking value of the respective amounts of visual masking for the sub-blocks.

For example, If the block is of a size (e.g., 32×32) that is greater than the smallest possible partition size (e.g., 8×8), then the worst visual masking characteristic of all of the sub-blocks of the block can be taken to be the visual masking characteristic of the block. If the block is of the smallest possible partition size (e.g., 8×8), then the visual masking characteristic is taken.

At 810, the technique 800 combines the visual masking characteristic of the block and the expected entropy of the block to obtain a splitting indicator value. That is, the entropy needed to reach the target quality can be combined with the worst-case visual masking to obtain the final splitting decision. As mentioned above, the masking characteristic of the block can be the worst-case visual masking of all the sub-blocks of the block. In an example, a linear model can be used to combine the masking characteristic of the block and the expected entropy of the block. In an example, the splitting indicator value can be obtained by multiplying the visual masking characteristic of the block and the expected entropy of the block.

At 812, the technique 800 determines whether to split the block based on the splitting indicator value. In an example, the splitting indicator value can be compared to a predefined constant (e.g., 5) that is empirically derived. If the splitting indicator value is smaller than the predefined constant, then the block is split; otherwise, it is not.

The transform splitting (partition) decision for the block is that which naturally causes an amount of ringing that is appropriate for the sub-blocks of the block. The transform splitting can favor larger transform sizes. To illustrate, assume that the block is a 32×32 block. If the amount of ringing (e.g., as calculated at 806 of the technique 800) of the 32×32 block is acceptable for the masking (as calculated at 810 of the technique 800), then a 32×32 transform is selected. On the other hand, if the amount of ringing is not acceptable, then the possible partitions of the block are each separately tested using the technique 800. For example, each of a first partition consisting of two 16×32 blocks and a second partition consisting of two 32×16 block are tested. If the respective amounts of ringing are not acceptable in the first partition and the second partition, then a third partition consisting of four 16×16 blocks is tested. Next, the following partitions can be tested: a fourth partition consisting of four 32×8 blocks, a fifth partition consisting of eight 16×16 blocks, a sixth partition consisting of eight 8×16 blocks, and a seventh partition consisting of sixteen 8×8 sub-blocks. That is, blocks are partitioned into smaller and smaller partitions until an acceptable amount value of ringing results and/or the smallest possible partitions are reached. As can be appreciated, there can be many different ways of testing partitions of a block.

Partitions of a block (or a sub-block) can be tested in order of size and the largest partition that results in an acceptable value of the splitting indicator can be selected as the partition of the block.

Figure 11:
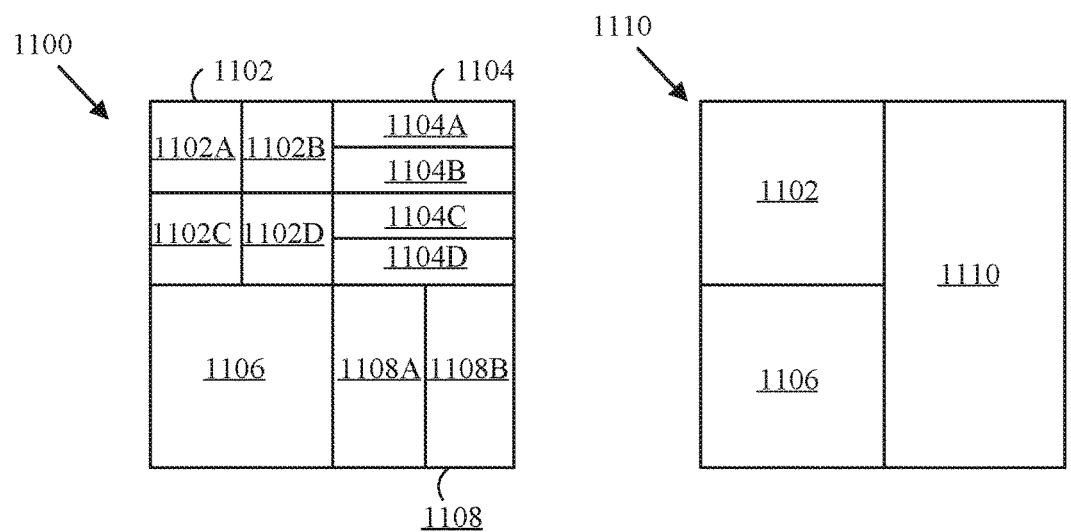
FIG. 11 illustrates a hypothetical comparative example of a transform partitioning scheme according to a conventional technique and a transform partitioning technique according to implementations of this disclosure.

FIG. 11 illustrates a hypothetical comparative example of a transform partitioning 1100 according to a conventional technique and a transform partitioning technique 1110 according to implementations of this disclosure. The example of FIG. 11 is merely for illustration purposes and does not limit the teachings of this disclosure in any way.

In the transform partitioning 1100 according to the conventional technique, a residual block (e.g., of size 32×32) may be partitioned into four transform sub-blocks 1102, 1104, 1106, and 1108 (e.g., each of size 16×16). The transform sub-block 1102 is further partitioned into sub-blocks 1102A, 1102B, 1102C, and 1102D (e.g., each of size 8×8). The transform sub-block 1104 may be further partitioned into sub-blocks 1104A, 1104B, 1104C, and 1104D (e.g., each of size 4×16). The transform sub-block 1106 is not partitioned further. The transform sub-block 1108 is further partitioned into sub-blocks 1108A and 1108B (e.g., each of size 16×8). The transform partitioning 1100 illustrates that a larger block (or sub-block) may be further split because it is determined to contain a smooth sub-block.

Contrastingly, the transform partitioning 1110 according to implementations of this disclosure results in the block being partitioned into the transform sub-block 1102 (e.g., of size 16×16), a sub-block 1110 (e.g., of size 32×16), and the transform sub-block 1106 (e.g., of size 16×16). Thus, the bicriteria block splitting heuristic for lossy compression described above used to determine whether smooth sub-blocks should be further split allows can result in transform sub-blocks of larger sizes.

For simplicity of explanation, the technique 800 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify," or any variations thereof, include selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of operations or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting station 102 and/or the receiving station 106 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of transmitting station 102 and the receiving station 106 do not necessarily have to be implemented in the same manner.

Further, in one implementation, for example, transmitting station 102 and the receiving station 106 can be implemented using a computer program that, when executed, carries out any of the respective methods, algorithms, and/or instructions described herein. In addition or alternatively, for example, a special-purpose computer/processor, which can contain specialized hardware for carrying out any of the methods, algorithms, or instructions described herein, can be utilized.

The transmitting station 102 and the receiving station 106 can, for example, be implemented on computers in a real-time video system. Alternatively, the transmitting station 102 can be implemented on a server, and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting station 102 and a receiving station 106 implementation schemes are available. For example, the receiving station 106 can be a generally stationary personal computer rather than a portable communications device, and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available. The above-described implementations have been described in order to allow easy understanding of the application and are not limiting. On the contrary, the application covers various modifications and equivalent arrangements included within the scope of the appended claims, which scope is to be accorded the broadest interpretation as is permitted under the law so as to encompass all such modifications and equivalent arrangements.

What is claimed is:

1. A method for partitioning a block of an image to reduce quantization artifacts, comprising:
    estimating an expected entropy of the block, wherein estimating the expected entropy comprises:
        determining respective Laplacians for pixels of the block, wherein determining the respective Laplacians for the pixels of the block comprises:
            for a pixel in a row and a column of the block, subtracting from the pixel a first value that is a first function of a first average of all pixels of the row and subtracting from the pixel a second value that is a second function of a second average of all pixels of the column;
    partitioning the block into sub-blocks;
    calculating respective amounts of visual masking for the sub-blocks, wherein a respective amount of visual masking for a respective sub-block is indicative of how visible an artifact resulting from inverse transformation is in the respective sub-block;
    selecting, as a visual masking characteristic of the block, a highest visual masking value of the respective amounts of visual masking for the sub-blocks;
    combining the visual masking characteristic of the block and the expected entropy of the block to obtain a splitting indicator value, wherein the combining comprises using a linear model or multiplying the visual masking characteristic and the expected entropy of the block; and
    determining whether to split the block based on the splitting indicator value.

2. The method of claim 1, wherein the block is of size 32×32, and wherein a smallest possible partition size is 8×8.

3. The method of claim 1, wherein estimating the expected entropy of the block further comprises:
    selecting an absolute maximum of the respective Laplacians as the expected entropy of the block.

4. The method of claim 1, wherein the first value being half of the first average, and wherein the second value being half of the second average.

5. The method of claim 1, wherein estimating the expected entropy of the block comprises:
    using a hypothetical encoder to encode the block, wherein the hypothetical encoder encodes the block to calculate a number of bits required to encode the block; and
    using the number of bits resulting from the hypothetical encoder as the expected entropy of the block.

6. The method of claim 1, wherein calculating the respective amounts of the visual masking for the sub-blocks comprises:
    calculating the respective amount of visual masking for a given sub-block using a formula $1/(1+x*x/(C*C))$, wherein x is a difference between the given sub-block and a reconstructed version of the block, and C is a constant that is related to a quality level.

7. The method of claim 6, wherein x is a maximum absolute Laplacian in a sub-block.

8. The method of claim 6, wherein x is a sum of respective Laplacians of pixels of a sub-block.

9. The method of claim 1, wherein the visual masking characteristic of the block and the expected entropy are linearly combined.

10. An apparatus for partitioning a block of an image to reduce quantization artifacts, comprising:
    a memory; and
    a processor, the processor configured to execute instructions stored in the memory to:
        estimate an expected entropy of the block;
        partition the block into sub-blocks;
        calculate respective amounts of visual masking for the sub-blocks, wherein a respective amount of visual masking for a respective sub-block is calculated based on a texture present in the respective sub-block or is indicative of how visible an artifact is in the respective sub-block, and wherein to calculate the respective amounts of the visual masking for the sub-blocks comprises to:

calculate the respective amount of visual masking for a given sub-block using a formula $1/(1+x*x/(C*C))$, wherein x indicates a difference between the given sub-block and a reconstructed version of the block, and C is a constant that is related to a quality level;

select, as a visual masking characteristic of the block, a highest visual masking value of the respective amounts of visual masking for the sub-blocks;

combine, using a linear model or multiplying the visual masking characteristic and the expected entropy of the block, the visual masking characteristic of the block and the expected entropy of the block to obtain a splitting indicator value; and determine whether to split the block based on the splitting indicator value.

11. The apparatus of claim 10, wherein the block is of size 32×32, and wherein a size of each sub-block is 5×5, the size being used as a visual masking sub-block size.

12. The apparatus of claim 10, wherein to estimate the expected entropy of the block comprises to:

determine respective Laplacians for pixels of the block; and select an absolute maximum of the respective Laplacians as the expected entropy of the block.

13. The apparatus of claim 12, wherein to determine the respective Laplacians for the pixels of the block comprises to:

for a pixel in a row and a column of the block, subtract from the pixel a first value that is a first function of a first average of all pixels of the row and subtract from the pixel a second value that is a second function of a second average of all pixels of the column.

14. The apparatus of claim 13, wherein the first value being half of the first average, and wherein the second value being half of the second average.

15. The apparatus of claim 10, wherein to estimate the expected entropy of the block comprises to:

use a hypothetical encoder to encode the block, wherein the hypothetical encoder encodes the block to calculate a number of bits required to encode the block; and use the number of bits resulting from the hypothetical encoder as the expected entropy of the block.

16. The apparatus of claim 10, wherein x is a maximum absolute Laplacian value in a sub-block.

17. The apparatus of claim 10, wherein x is a sum of respective Laplacians of pixels of a sub-block.

18. A non-transitory computer-readable storage medium, comprising executable instructions that, when executed by a processor, facilitate performance of operations comprising:

partitioning a block of an image to reduce quantization artifacts, comprising:

estimating an expected entropy of the block;

partitioning the block into sub-blocks;

calculating respective amounts of visual masking for the sub-blocks, wherein a respective amount of visual masking for a respective sub-block is calculated based on a texture present in the respective sub-block and is indicative of how visible an artifact is in the respective sub-block, and wherein calculating the respective amounts of the visual masking for the sub-blocks comprises:

calculating the respective amount of visual masking for a given sub-block using a formula $1/(1+x*x/(C*C))$, wherein x indicates a difference between the given sub-block and a reconstructed version of the block, and C is a constant that is related to a quality level;

selecting, as a visual masking characteristic of the block, a highest visual masking value of the respective amounts of visual masking for the sub-blocks;

combining the visual masking characteristic of the block and the expected entropy of the block to obtain a splitting indicator value, wherein the combining comprises using a linear model or multiplying the visual masking characteristic and the expected entropy of the block; and determining whether to split the block based on the splitting indicator value.

19. The non-transitory computer-readable storage medium of claim 18, wherein estimating the expected entropy of the block comprises:

determining respective Laplacians for pixels of the block; and selecting an absolute maximum of the respective Laplacians as the expected entropy of the block.

20. The non-transitory computer-readable storage medium of claim 19, wherein determining the respective Laplacians for the pixels of the block comprises:

for a pixel in a row and a column of the block, subtracting from the pixel a first value that is a first function of a first average of all pixels of the row and subtracting from the pixel a second value that is a second function of a second average of all pixels of the column.

* * * * *